(12) United States Patent
Matsubara et al.

(10) Patent No.: US 12,372,312 B2
(45) Date of Patent: Jul. 29, 2025

(54) THERMAL CRACKING TUBE WITH FLUID AGITATING ELEMENT

(71) Applicant: KUBOTA CORPORATION, Osaka (JP)

(72) Inventors: Motoyuki Matsubara, Hirakata (JP); Kunihide Hashimoto, Hirakata (JP); Toru Sukawa, Hirakata (JP)

(73) Assignee: KUBOTA CORPORATION, Osaka (JP)

( * ) Notice: Subject to any disclaimer, the term of this patent is extended or adjusted under 35 U.S.C. 154(b) by 793 days.

(21) Appl. No.: 17/613,639

(22) PCT Filed: Jun. 21, 2021

(86) PCT No.: PCT/JP2021/023412
§ 371 (c)(1),
(2) Date: Nov. 23, 2021

(87) PCT Pub. No.: WO2022/004465
PCT Pub. Date: Jan. 6, 2022

(65) Prior Publication Data
US 2022/0316814 A1    Oct. 6, 2022

(30) Foreign Application Priority Data

Jun. 29, 2020  (JP) ................. 2020-111567

(51) Int. Cl.
*F28F 1/40*    (2006.01)
(52) U.S. Cl.
CPC ..................... *F28F 1/40* (2013.01)
(58) Field of Classification Search
CPC .... F28F 1/40; F28F 13/12; B01J 2219/00164; B01J 19/0013; B01J 19/006;
(Continued)

(56) References Cited

U.S. PATENT DOCUMENTS 3,826,304 A * 7/1974 Withers, Jr. ............ F25B 39/02
62/115
4,658,892 A * 4/1987 Shinohara ............. F28F 13/187
165/184
(Continued)

FOREIGN PATENT DOCUMENTS

CN    102636054 A       8/2012
CN    109579363 A  *    4/2019    ............. F25B 30/06
(Continued)

OTHER PUBLICATIONS

Japanese Patent Office "International Search Report" from Japanese priority application PCT/JP2021/023412, Aug. 3, 2021 (Aug. 3, 2021), 3 pp.

*Primary Examiner* — Len Tran
*Assistant Examiner* — Gustavo A Hincapie Serna
(74) *Attorney, Agent, or Firm* — Eckert Seamans Cherin & Mellott, LLC

(57) ABSTRACT

The present invention provides a thermal cracking tube formed with an agitating element that has a good agitation effect and improves heat transfer efficiency while minimizing an increase in the pressure loss of the fluid flowing through the cracking tube.

A thermal cracking tube 10 with an agitating element of the present invention is a thermal cracking tube having a tube axis with one end and the other end, wherein a fluid inlet is on the one end and a fluid outlet is on the other end, the tube being provided on an inner surface thereof with one or more fluid agitating elements 20 extending from the inner surface of the tube and having an inwardly facing top portion, wherein the agitating element is helically inclined to or is orthogonal to a longitudinal direction of the tube axis, and
(Continued)

the top portion deviates to the fluid inlet side 11 or the fluid outlet side 12, relative to a center 0 of a width direction of the agitation element.

11 Claims, 8 Drawing Sheets

(58) Field of Classification Search
CPC .................. B01J 19/2405; C10G 9/14; F28D 2021/0022; F28D 2021/0056; F28D 2021/0059; F28D 2021/0075
USPC ....................................................... 165/109.1
See application file for complete search history.

(56) References Cited

U.S. PATENT DOCUMENTS

| | | | | | |
|---|---|---|---|---|---|
| 4,733,698 | A * | 3/1988 | Sato | ..................... | B21C 37/20 165/177 |
| 5,010,643 | A * | 4/1991 | Zohler | ..................... | F28F 1/40 29/890.048 |
| 5,259,448 | A * | 11/1993 | Masukawa | ..................... | F28F 1/40 165/184 |
| 5,332,034 | A * | 7/1994 | Chiang | ..................... | F28F 1/40 165/184 |
| 5,692,560 | A * | 12/1997 | Messant | ..................... | F28F 1/42 165/184 |
| 5,791,405 | A * | 8/1998 | Takiura | ..................... | B21C 37/20 165/184 |
| 5,862,857 | A * | 1/1999 | Ishikawa | ..................... | F28F 1/40 165/184 |
| 5,975,196 | A * | 11/1999 | Gaffaney | ..................... | F28F 1/40 165/184 |
| 6,000,466 | A * | 12/1999 | Aoyagi | ..................... | F28F 1/40 165/183 |
| 6,026,892 | A * | 2/2000 | Kim | ..................... | B21C 37/083 165/184 |
| 6,164,370 | A * | 12/2000 | Robinson | ..................... | B21C 37/20 165/184 |
| 6,308,775 | B1 * | 10/2001 | Naumann | ..................... | F28F 13/04 165/184 |
| 7,048,043 | B2 * | 5/2006 | Leterrible | ..................... | F28F 1/40 165/184 |
| 7,311,137 | B2 * | 12/2007 | Thors | ..................... | F28F 1/40 165/184 |
| 7,963,318 | B2 * | 6/2011 | Wolpert | ..................... | C10G 9/20 165/184 |
| 10,422,589 | B2 * | 9/2019 | Ishimori | ..................... | F28F 1/08 |
| 10,900,722 | B2 * | 1/2021 | Reagen | ..................... | B21C 37/202 |
| 2002/0070011 | A1 * | 6/2002 | Itoh | ..................... | F28F 1/40 165/184 |
| 2003/0019614 | A1 * | 1/2003 | Iwamoto | ..................... | F28F 1/42 165/184 |
| 2003/0111210 | A1 * | 6/2003 | Tsujita | ..................... | F28F 1/426 165/158 |
| 2003/0188850 | A1 * | 10/2003 | Liu | ..................... | B01D 53/885 165/177 |
| 2004/0244958 | A1 * | 12/2004 | Dilley | ..................... | F28F 1/42 165/184 |
| 2005/0045319 | A1 * | 3/2005 | Leterrible | ..................... | F28F 1/40 165/177 |
| 2006/0102327 | A1 * | 5/2006 | Inui | ..................... | F28F 1/40 165/184 |
| 2007/0089868 | A1 * | 4/2007 | Houfuku | ..................... | F28F 1/40 165/184 |
| 2009/0180935 | A1 * | 7/2009 | Higuchi | ..................... | F28F 21/08 422/129 |
| 2009/0229802 | A1 * | 9/2009 | Ishimori | ..................... | F02M 26/32 165/163 |
| 2009/0250198 | A1 * | 10/2009 | Li | ..................... | F28F 1/426 165/133 |
| 2010/0143206 | A1 * | 6/2010 | Hashimoto | ..................... | C10G 75/00 422/129 |
| 2014/0116668 | A1 * | 5/2014 | Maniar | ..................... | F28F 1/426 165/181 |
| 2015/0114609 | A1 * | 4/2015 | Wang | ..................... | F28F 1/40 165/109.1 |
| 2018/0202722 | A1 * | 7/2018 | Jackson | ..................... | H02K 5/203 |
| 2020/0190408 | A1 * | 6/2020 | Jakobi | ..................... | C10G 9/36 |
| 2020/0326141 | A1 * | 10/2020 | Wang | ..................... | F28F 13/18 |
| 2020/0377801 | A1 * | 12/2020 | Indurain Y Urricelqui | ..................... | F28F 1/025 |
| 2023/0019344 | A1 * | 1/2023 | Flahaut | ..................... | C10G 9/20 |

FOREIGN PATENT DOCUMENTS

| | | | | |
|---|---|---|---|---|
| EP | 2 230 009 A1 | | 9/2010 | |
| JP | H11285764 A | * | 4/1998 | |
| JP | 2002-115933 A | | 4/2002 | |
| JP | 2008-249249 A | | 10/2008 | |
| JP | 2019-27668 A | | 2/2019 | |
| WO | WO-2012119661 A1 | * | 9/2012 | ............... F15D 1/02 |

* cited by examiner

THERMAL CRACKING TUBE WITH FLUID AGITATING ELEMENT

TECHNICAL FIELD

The present invention relates to a thermal cracking tube used for a thermal cracking reaction furnace for producing, for example, ethylene, and more specifically, relates to a thermal cracking tube with an agitating element wherein it protrudes from an inner surface from the tube and is configured to enhance an agitation action of a fluid flowing through the cracking tube.

BACKGROUND ART

Olefin, such as ethylene and propylene, is produced by passing a feedstock fluid material containing hydrocarbon (such as naphtha, natural gas, ethane, etc.) at high speed through a thermal cracking tube heated from outside, heating the feedstock fluid material to a reaction temperature range, and subjecting the heated material to the thermal cracking process.

For an efficient thermal cracking reaction, it is essential to heat the feedstock flowing at high speed to reach the reaction temperature range in a short time at the center in the radial direction of the cracking tube and avoid excessive heating as much as possible. The excessive heating of the feedstock fluid material leads to a lightening of hydrocarbons to produce methane, free carbon, etc. It causes a polycondensation reaction of thermally decomposed products, resulting in a decrease of the yield of the target product. In addition, a phenomenon of coking (pyrolysis of free carbon on an inner tube surface) is facilitated so that the heat transfer coefficient of the tube body declines. In this case, decoking works are required to perform more frequently, which causes a decrease in operating hours.

In the prior art, a thermal cracking tube is formed on an inside surface thereof with projecting lines having a semi-circular or semi-elliptical cross-sectional surface. Then, the projecting lines are helically turned relative to a tube axis (for example, see Patent Document 1). The feedstock fluid material flowing at high speed is agitated by a function of the projecting lines, which enhances heat transfer to heat the material rapidly, whereby the thermal cracking process becomes completed in a short time. This reduces excessive cracking and coking caused by excessive heating. In addition, improvement in heat transfer efficiency of the thermal cracking tube lowers the heating temperature of the thermal cracking tube, thus extending the service life of the thermal cracking tube.

PRIOR ART DOCUMENT(S)

Patent Document(s)

Patent Document 1: JP-A-2008-249249

SUMMARY OF THE INVENTION

Problems to be Solved by the Invention

There is a demand to further improve the heat transfer efficiency of the thermal cracking tube. To meet this demand, an enhancement of the agitation of the fluid by a projecting line is needed. When the height of the projecting line is made higher without changing the shape, the agitation effect increases but causes a passage of the fluid narrower to increase the pressure loss of the fluid. Thus, this structure did not lead to an improvement in the coefficient of heat transfer and the yield of the target product.

Thus, there is a need to develop a thermal cracking tube that can provide a good agitation effect while minimizing an increase in the pressure loss of the fluid flowing through the tube, thereby improving heat transfer efficiency to achieve an increase in the yield of the target product.

An object of the present invention is to provide a thermal cracking tube formed with an agitating element that produces a good agitation effect while minimizing an increase in the pressure loss of the fluid flowing through the tube and improves the heat transfer efficiency.

Means to Overcome the Problems

A thermal cracking tube with an agitating element according to the present invention has a tube axis with one end and the other end, wherein a fluid inlet is on the one end and a fluid outlet is on the other end, the cracking tube being provided on an inner surface thereof with one or more fluid agitating elements having an inwardly facing top portion and extending from the inner surface of the tube, wherein
 the agitating element is helically inclined to or is orthogonal to a longitudinal direction of the tube axis, and
 the top portion deviates to the fluid inlet side or the fluid outlet side, relative to a center of a width direction of the agitating element.

The top portion of the agitating element preferably deviates to the fluid inlet side by at least 10% or to the fluid outlet side by at least 5%, relative to the center of the width direction of the agitating element.

The top portion of the agitating element preferably deviates to the fluid inlet side by up to 90% or to the fluid outlet side by up to 85%, relative to the center of the width direction of the agitating element.

The agitating element may have oppositely inclined surfaces across the top portion thereof, wherein the oppositely inclined surfaces comprise an inlet-side inclined surface on the fluid inlet side and an outlet-side inclined surface on the fluid outlet side, wherein the inlet-side inclined surface and the outlet-side inclined surface are different in their inclined angles.

The inlet-side inclined surface and/or the outlet-side inclined surface may be a convex shape or a concave shape.

The inclined surface of the convex shape or the concave shape may further include at least one projected portion or depressed portion.

The agitating element has a length longer in the longitudinal direction than the width direction.

The top portion has a substantially flat surface wherein a center of the width direction of the flat surface deviates to the fluid inlet side or the fluid outlet side.

Effects of the Invention

With the thermal cracking tube of the present invention, the fluid is subjected to agitation by the agitating element. The top portion of the agitating element deviates to the fluid inlet side or the fluid outlet side relative to a center of a width direction of the agitating element. When the top portion of the agitating element is in a position deviating to the fluid inlet side, the inclination angle on the fluid inlet side gets steep to increase the resistance of the fluid hitting against the agitating element so that the fluid flows powerfully toward the tube axis that is a center of the tube and the agitation energy of the fluid is increased. As a result, the fluid destroys stagnation of gas that occurs on the inner surface of the tube, improving the heat transfer efficiency. On the other hand, when the top portion of the agitating element is in a position deviating to the fluid outlet side, the inclination angle on the fluid outlet side gets steep so that the fluid flowing over the agitating element hits against the inner surface of the tube. As a result, the fluid destroys stagnation of gas that occurs on the inner surface of the tube, improving the heat transfer efficiency. For the top portion deviating to either of the fluid inlet side or the fluid outlet side, the thermal cracking tube provides a good agitation effect while minimizing an increase in the pressure loss of the fluid flowing through the tube and improving the heat transfer efficiency, thus achieving an increase of the yield of the target product and a decrease of occurrence of coking due to an excessive pyrolysis.

FORM FOR CARRYING OUT THE INVENTION

Figure 1:
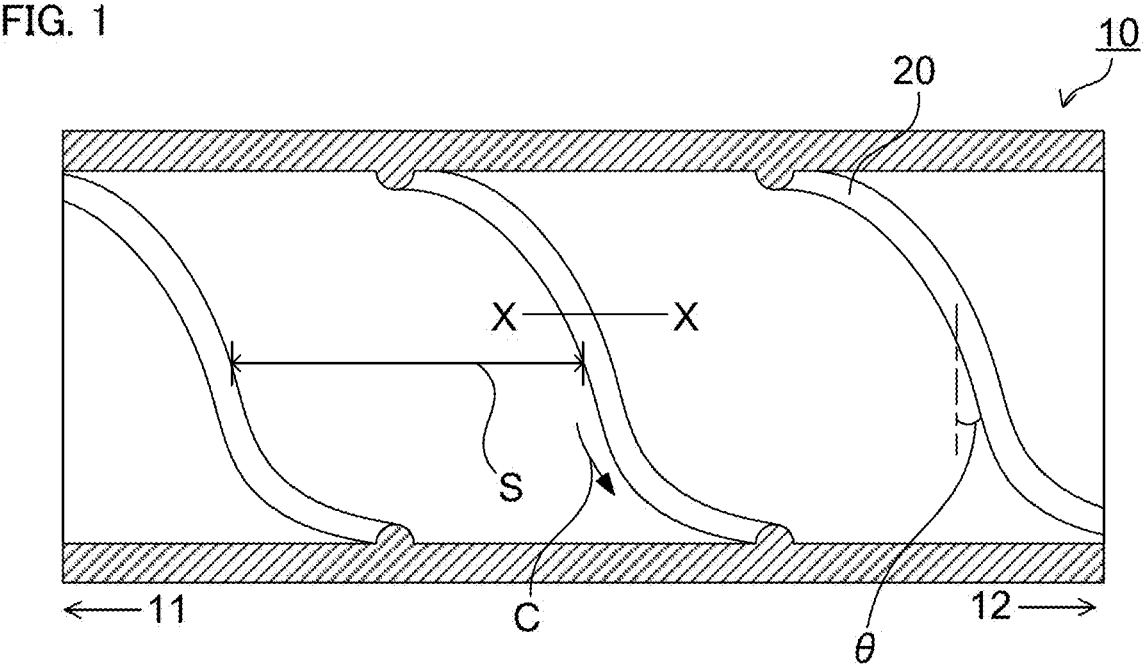
FIG. 1 is a cross-sectional view along a tube axis of a thermal cracking tube formed with an agitating element, according to one embodiment of the present invention.

Thermal cracking tube 10 according to the present invention will be explained with reference to the drawings. Thermal cracking tube 10 illustrated in the drawing is a straight tube, but is generally formed in a helical shape by connecting the straight tube to the straight tube with a bend tube and then installed in a thermal cracking furnace. Thermal cracking tube 10 is heated from outside. Feedstock fluid material flowing through the cracking tube is subjected to pyrolysis.

Figure 2:
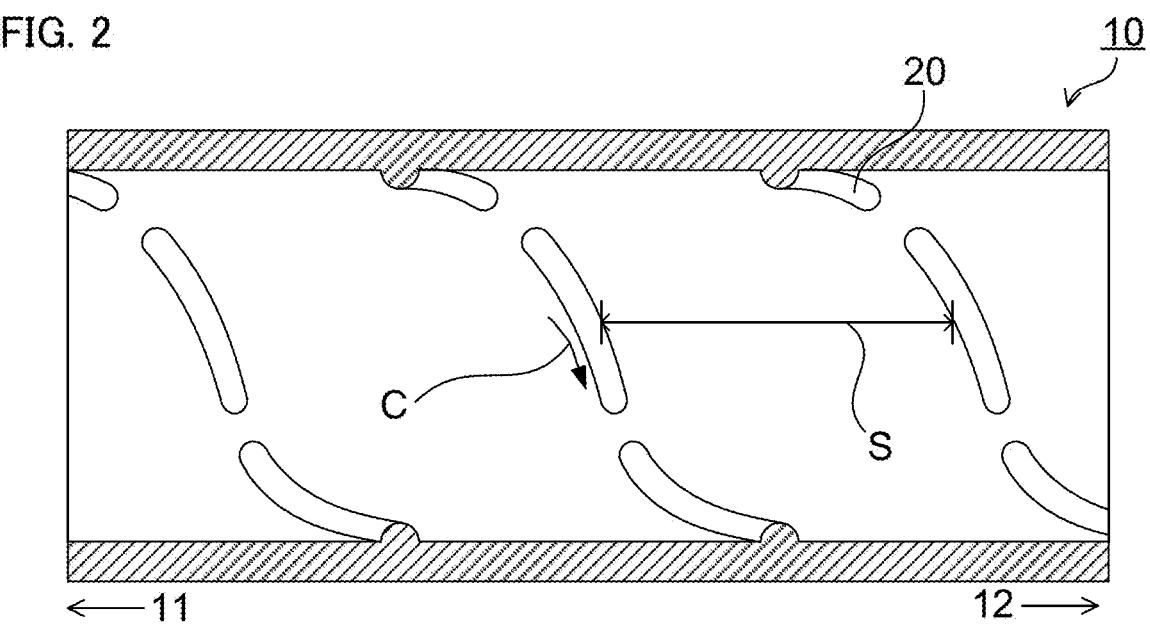
FIG. 2 is a cross-sectional view along the tube axis of the thermal cracking tube wherein the agitating elements are formed in an intermittent pattern and placed in a helical shape.
Figure 3:
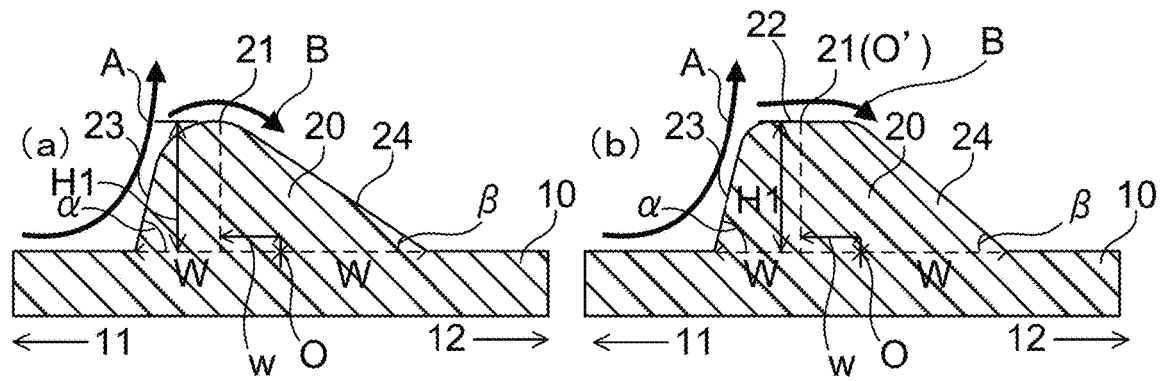
FIGS. 3(a) and (b) are cross-sectional views taken along the line X-X in FIG. 1 and show cross-sectional views of the agitating element having a top portion deviating to the fluid inlet side, wherein (a) is a cross-sectional view of the agitating element formed in a mountain-like shape and (b) is a cross-sectional view of the agitating element formed in a mountain-like shape having a flattened top portion.
Figure 4:
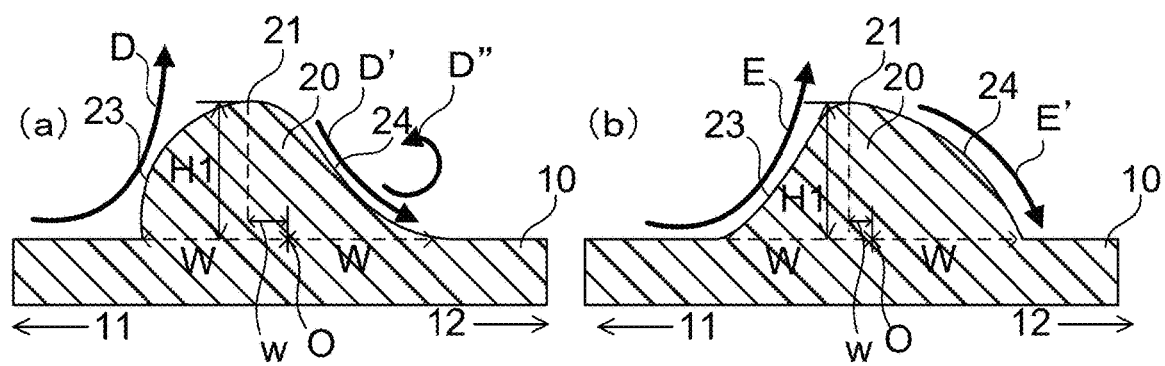
FIGS. 4(a) and (b) are cross-sectional views taken along the line X-X in FIG. 1 and show cross-sectional views of the agitating element having a top portion deviating to the fluid inlet side, wherein (a) is a cross-sectional view of the agitating element showing an inlet-side inclined surface with a convex shape and an outlet-side inclined surface with a concave shape, and (b) is a cross-sectional view of the agitating element showing an inlet-side inclined surface with a concave shape and an outlet-side inclined surface with a convex shape.
Figure 5:
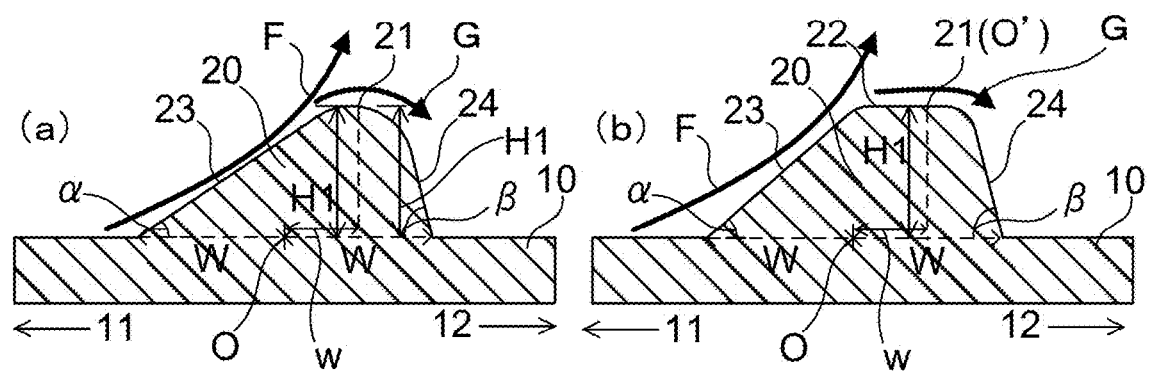
FIGS. 5(a) and (b) are cross-sectional views taken along the line X-X in FIG. 1 and show cross-sectional views of the agitating element having a top portion deviating to the fluid outlet side, wherein (a) is a cross-sectional view of the agitating element formed in a mountain-like shape and (b) is a cross-sectional view of the agitating element formed in a mountain-like shape having a flattened top portion.
Figure 6:
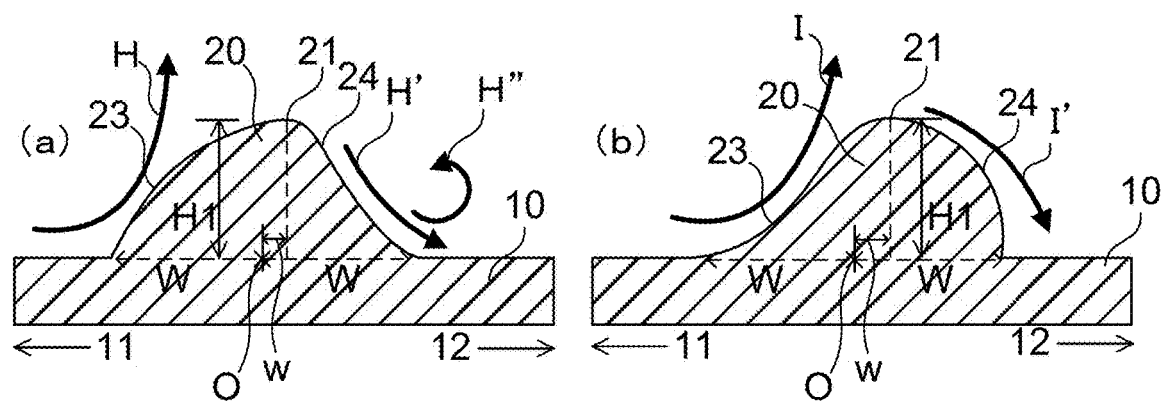
FIGS. 6 (a) and (b) are cross-sectional views taken along the line X-X in FIG. 1 and show cross-sectional views of the agitating element having a top portion deviating to the fluid outlet side, wherein (a) is a cross-sectional view of the agitating element showing an inlet-side inclined surface with a convex shape and an outlet-side inclined surface with a concave shape, and (b) is a cross-sectional view of the agitating element showing an inlet-side inclined surface with a concave shape and an outlet-side inclined surface with a convex shape.

FIG. 1 is a cross-sectional view taken along a tube axis of one embodiment of thermal cracking tube 10 according to the present invention and shows the cracking tube 10 wherein agitating element 20 is helically formed in a continuous pattern. FIG. 2 is a cross-sectional view showing the cracking tube 10 wherein agitating elements 20 are helically formed in an intermittent pattern. FIG. 3 and FIG. 4 are enlarged cross-sectional views taken along the line X-X in FIG. 1 and show agitating elements 20 of the First Embodiment. FIG. 5 and FIG. 6 are enlarged cross-sectional views of agitating elements 20 of the Second Embodiment. For the sake of explanation on the cracking tube 10 in FIG. 1, the left side of the paper is referred to as fluid inlet side 11, and the right side of the paper is as fluid outlet side 12. FIG. 3 and FIG. 4 illustrate the First Embodiment wherein top portion 21 of agitating element 20 deviates to fluid inlet side 11 of the cracking tube 10. FIG. 5 and FIG. 6 illustrate the Second Embodiment wherein top portion 21 of agitating element 20 deviates to fluid outlet side 12 of the cracking tube 10. Components common to the First and Second Embodiments will be described below first, and then each of the embodiments will be explained.

The cracking tube 10 can be made of a heat-resistant alloy material, such as 25Cr—Ni (SCH22), 25Cr-35Ni (SCH24), Incoloy (trademark name), and an alloy containing up to 6.0 mass % of Al. However, the material of thermal cracking tube 10 is not limited to them. There may be other various kinds of heat-resistant alloy materials that can withstand use under a high-temperature environment and provide the performance as required.

The cracking tube 10 is formed on an inner surface thereof with agitating element 20 projecting inwardly from the inner surface. More specifically, agitating element 20 may be formed in a projecting line that protrudes from the inner surface of agitating element 20. The present invention is characterized in that agitating element 20 has top portion 21 deviating to fluid inlet side 11 or fluid outlet side 12.

In FIG. 1, agitating element 20 is made in a continuous shape with its longitudinal direction inclined in a helical pattern. When an angle of agitating element 20 inclined from the upstream to the downstream relative to a surface orthogonal to the tube axis is defined as 0, agitating element 20 may have the same or different inclined angle θ from the upstream to the downstream of thermal cracking tube 10. For example, the inclination angle θ of agitating element 20 is up to 85°, preferably up to 30°. The inclination angle θ of agitating element 20 is preferably at least 15°. On the other hand, agitating element 20 may be θ=0, i.e., orthogonal to the tube axis. If the inclined angle is too small, stagnation of the fluid is more likely to occur downstream of agitating element 20. On the other hand, the smallness of the inclined angle makes the inclination of the agitating element larger to improve effects such as the agitation and occurrence of turbulent flow of the fluid flowing through the cracking tube.

Agitating element 20 may be an intermittent configuration, as illustrated in FIG. 2, instead of the continuous structure. The discontinuous system slightly reduces the agitation effect but provides a significant decrease in pressure loss of the fluid.

The agitating element preferably has a length longer in the longitudinal direction than the width direction perpendicular to that. This structure provides that the fluid suitably impinges on agitating element 20 in the cracking tube, thus improving agitation.

The distance S (see FIG. 1) between agitating elements 20 may be about 20 to 400 mm for the cracking tube having an inner diameter of 30 to 150 mm. Agitating element 20 shown in FIG. 1 is a form of a single helical line, but agitating element 20 may be a plurality of lines of helical shape arranged in parallel or different inclination angles.

A height (H1) (see FIG. 3(a), FIG. 5(a), etc.) of agitating element 20 is preferably about 1/60 to 1/10 of the inner diameter of the cracking tube. If the height (H1) of agitating element 20 is lower than 1/60 of the tube inner diameter, there may not be able to fully demonstrate the agitating and turbulent flow effects of the fluid. If the height (H1) of agitating element 20 is higher than 1/10 of the tube's inner diameter, agitating element 20 itself becomes a flow passage resistance to obstruct the flow of the fluid and increase the pressure loss. In addition, the fluid is likely to accumulate in the downstream side of agitating element 20, resulting in excessive cracking and deposition of the coke. Therefore, the height (H1) of agitating element 20 is determined as described above.

Agitating element 20 can be made of the same heat-resistant alloy material as those of the above-described thermal cracking tube 10, but the material is not limited to them.

Agitating element 20 can be efficiently formed as a build-up bead by build-up welding methods, such as powder plasma welding (PTA welding), MIG welding, TIG welding, and laser welding. Thermal cracking tube 10 and agitating element 20 may be integrally manufactured by extrusion processing or can be formed by machining, such as cutting.

First Embodiment

In the First Embodiment, as illustrated in cross-sectional views of FIG. 3(a), FIG. 4(a), FIG. 4(b), and FIG. 7(b), top portion 21 of agitating element 20 deviates to fluid inlet side 11. As used herein, top portion 21 of agitating element 20 refers to the highest part of agitating element 20 extending inwardly toward the tube axis side from the inner surface of the tube. In the case where agitating element 20 is a mountain type, as illustrated in FIG. 3(a), top portion 21 refers to a peak of agitating element 20. In the case where agitating element 20 has flat surface 22, as illustrated in FIG. 3(b), top portion 21 refers to a center O' in the width direction of flat surface 22.

A degree of deviation of top portion 21 relative to a center O of the width direction of agitating element 20, i.e., an off-center degree, is preferably at least 10%, more preferably at least 30% toward fluid inlet side 11. The off-center degree is preferably up to 90%, more preferably up to 80% toward fluid inlet side 11. When the width of agitating element 20 is "2W," as shown in FIG. 3(a), the off-center degree is given as "w/W×100%" wherein "w" is a distance between top portion 21 and the center O in the width direction of agitating element 20. When the agitating element has a flat surface 22, as shown in FIG. 3(b), the off-center degree is given as the distance "w" between the center O' of top portion 21 and the center O in the width direction of agitating element 20.

The off-center degree toward fluid inlet side 11 relative to the center O in the width direction of agitating element 20 is arranged to have lower and upper limits larger than those of the off-center degree toward fluid outlet side 12 in the Second Embodiment. This arrangement achieves an improvement in the yield of the target product because agitating element 20 with top portion 21 deviating to fluid inlet side 11 has an agitation effect and its accompanying swirl flow that are superior to those of agitating element 20 with top portion 21 deviating to fluid outlet side 12.

Disposed between top portion 21 of agitating element 20 are inlet-side inclined tube 23 on fluid inlet side 11 and outlet-side inclined surface 24 on fluid outlet side 12. An inclination angle α of inlet-side inclined surface 23 to the inner surface of the tube is preferably larger than an inclination angle β of outlet-side inclined surface 24 to the inner surface of the tube. Specifically, the inclination angle α is preferably larger than the inclination angle β by at least 5°, more preferably by at least 10°. The fluid passing through the tube impinges on a steep surface of inlet-side inclined surface 23 to increase flow resistance and go faster toward the tube axis of the center of the tube, thus increasing the agitation energy of the fluid. As a result, the fluid destroys the stagnation of gas that occurs on the inner surface of the tube.

Inlet-side inclined surface 23 and outlet-side inclined surface 24 can be formed into flat shapes, as illustrated in FIG. 3.

When the fluid flows from fluid inlet side 11 toward fluid outlet side 12 through thermal cracking tube 10 wherein top portion 21 of agitating element 20 is in a position deviating to fluid inlet side 11, the fluid impinges on inlet-side inclined surface 23 of agitating element 20. As a result, it produces a powerful flow heading for the tube axis, as indicated by arrow A in FIG. 3, or a flow passing over agitating element 20, as shown by arrow B. The fluid's flow heading for the tube axis provides a suitable agitation in the radial direction of the tube. It decreases the temperature difference of the fluid in the radial direction of the cracking tube, achieving a uniform temperature rise. In addition, the fluid's flow passing over agitating element 20 prevents stagnation of gas that occurs in the vicinity of the inner surface of the tube or breaks the stagnation of gas, thus contributing to an improvement in heat transfer efficiency. Furthermore, in the case where agitating element 20 is formed in a helical line with respect to the tube axis, a part of the fluid becomes a swirl flow along agitating element 20, as shown by arrow C in FIG. 1, improving the agitation effect and heat transfer efficiency.

Figure 7:
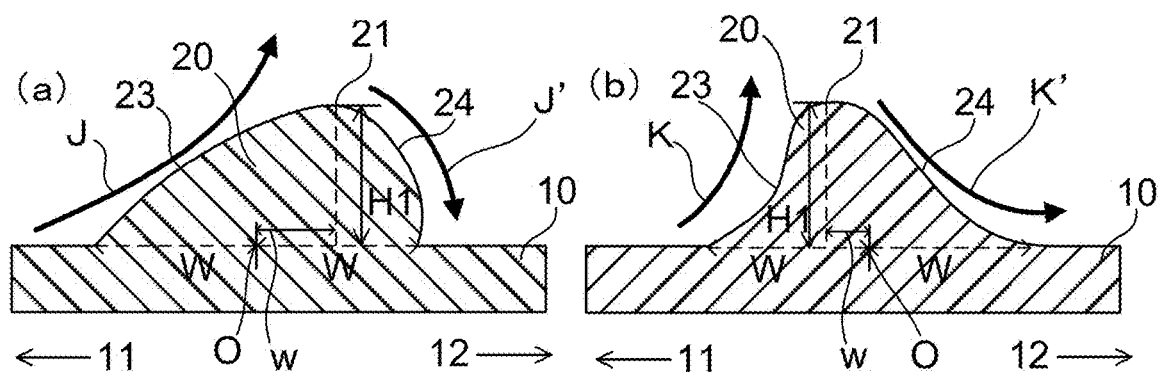
FIGS. 7 (a) and (b) are cross-sectional views taken along the line X-X in FIG. 1 and show cross-sectional views of the agitating element having a top portion deviating to the fluid outlet side, wherein (a) is a cross-sectional view of the agitating element showing an inlet-side inclined surface and an outlet-side inclined surface, both with a concave shape, and (b) is a cross-sectional view of the agitating element showing an inlet-side inclined surface with a convex shape and an outlet-side inclined surface, both with a concave shape.

Inlet-side inclined surface 23 and outlet-side inclined surface 24 can be a convex shape as illustrated in FIG. 4(*a*), or can be a concave shape as illustrated in FIG. 4(*b*) and FIG. 7(*b*). The convex shape of inlet-side inclined surface 23 makes a rising portion on fluid inlet side 11 steeper. It renders a part of the fluid impinging on the surface 23 to a powerful flow (arrow D) heading for the tube axis, achieving a suitable agitation in the radial direction of the tube. The concave shape of inlet-side inclined surface 23 makes an angle in the vicinity of the top portion 21 steeper. Thus, it accelerates a flow of the fluid impinging on surface 23 and heading for the downstream to provide a powerful flow (arrows E and K) from the middle, thus improving the agitation effect.

Outlet-side inclined surface 24 is configured to have a gradual slope (a horizontal distance from top portion 21 to a base, i.e., "W+w" is long) and a concave shape (FIG. 4(*a*)). The gradual slope and the concave shape of outlet-side inclined surface 24 renders agitating element 20 to a steep profile immediately after top portion 21 and powerfully accelerates the fluid flow (arrow D'). The fluid that accelerated toward the inner surface of the cracking tube destroys stagnation of gas that occurs on the inner surface of the tube, improving the heat transfer efficiency. In addition, a part of the fluid becomes a swirl flow (arrow D") along the concave profile. On the other hand, outlet-side inclined surface 24 is configured to have a gradual slope (a horizontal distance from top portion 21 to a base, i.e., "W+w" is long) and a convex shape, as shown in FIG. 4(*b*). The fluid can move smoothly along agitating element 20 immediately past top portion 21. Because the agitating element becomes steep toward the inner surface of the tube at a trailing portion, the fluid then accelerates to impinge on the tube's inner surface, as shown by arrow E', thus breaking stagnation of gas that occurs in the vicinity of the inner surface of the tube and improving the heat transfer efficiency.

Inlet-side inclined surface 23 and/or outlet-side inclined surface 24 having a convex or concave profile may be formed with at least one projected part 25 or recessed part 26, thereby creating a turbulent flow in the fluid to enhance the agitation effect further.

As described above, agitating element 20 having top portion 21 formed in the inside of the tube and deviating to fluid inlet side 11 improves the agitation effect of the fluid while minimizing an increase in the pressure loss of the fluid flowing through the tube, thereby improving heat transfer efficiency to achieve an increase in the yield of the target product. The agitating element is configured to prevent excessive heating and stagnation of fluid gas by a suitable fluid agitation, thereby reducing an occurrence of coking by excessive pyrolysis of the fluid, decreasing decoking works, increasing operating hours, and increasing the yield of the objective product.

Second Embodiment

According to the Second Embodiment, top portion 21 of agitating element 20 deviates to fluid outlet side 12, as shown in the cross-sectional view of FIG. 5. Further description is omitted for the details already described in top portion 21 and the off-center degree in the First Embodiment.

An off-center degree of top portion 21 relative to a center O of the width direction of agitating element 20 is preferably at least 5%, more preferably at least 15% toward fluid outlet side 12. The off-center degree is preferably up to 85%, more preferably up to 75% toward fluid inlet side 12. Inlet-side inclined surface 23 can be gradually sloped, and outlet-side inclined surface 24 can be steep-sloped by deviating top portion 21 to fluid outlet side 12. An inclination angle of inlet-side inclined surface 23 can be increased by forming the surface 23 into a concave shape, and an inclination angle of outlet-side inclined surface 24 can be decreased by forming the surface 24 into a convex shape, thus improving the agitation effect and the heat transfer efficiency of the fluid.

Disposed between the top portion 21 of agitating element 20 are inlet-side inclined tube 23 on fluid inlet side 11 and outlet-side inclined surface 24 on fluid outlet side 12. Contrary to the First Embodiment, an inclination angle β of outlet-side inclined surface 24 to the inner surface of the tube is preferably larger than α of inlet-side inclined surface 23 to the inner surface of the tube. Specifically, the inclination angle β is larger than the inclination angle α preferably by at least 5°, more preferably by at least 10°. The fluid passing over the tube gains speed along a steep surface of outlet-side inclined surface 24 to impinge on the inside surface of the tube with increased agitation energy. As a result, the fluid destroys a film to be formed on fluid outlet side 12 of the agitating member 20, improving the heat transfer efficiency. In either of embodiments, the thermal cracking tube provides a good agitation effect while minimizing an increase in the pressure loss of the fluid and improving the heat transfer efficiency, thus achieving an increase of the yield of the target product and a decrease of coking occurred by excessive pyrolysis.

As illustrated in FIG. 3, inlet-side inclined surface 23 and outlet-side inclined surface 24 can be formed into flat shapes.

When the fluid flows from fluid inlet side 11 toward fluid outlet side 12 through thermal cracking tube 10 wherein top portion 21 of agitating element 20 deviates to fluid inlet side 11, the fluid impinges on inlet-side inclined surface 23 of agitating element 20. As a result, it produces a powerful flow heading for the tube axis, as indicated by arrow F in FIG. 5, or a flow passing over agitating element 20, as shown by arrow G. Since inlet-side inclined surface 23 of agitating element 20 is more gradual than the First Embodiment, the fluid's flow heading for the tube axis has less momentum than the First Embodiment. Therefore, it can inhibit the increase of pressure loss. In addition, the fluid's flow passing over agitating element 20 impinges on a steep surface of outlet-side inclined surface 24 to prevent gas stagnation from being generated in the vicinity of the inner surface of the tube or to break the stagnation of gas, thus improving the heat transfer efficiency. Furthermore, in the case where agitating element 20 is formed in a helical line with respect to the tube axis, a part of the fluid becomes a swirl flow along agitating element 20, as shown by arrow C in FIG. 1, improving the agitation effect and heat transfer efficiency.

As shown in FIG. 6(*a*), FIG. 6(*b*), and FIG. 7(*a*), inlet-side inclined surface 23 and outlet-side inclined surface 24 may be formed into a convex or concave shape. FIG. 6 and FIG. 7(*a*) are embodiments wherein top portion 21 of agitating element 20 deviates to the outlet side 12. In FIG. 6(*a*), inlet-side inclined surface 23 has the convex shape, and outlet-side inclined surface 24 has the concave shape. In FIG. 6(*b*), inlet-side inclined surface 23 has the concave shape, and outlet-side inclined surface 24 has the convex shape. In FIG. 7(*a*), both inlet-side inclined surface 23 and outlet-side inclined surface 24 are convex.

As shown in FIG. 6(a) and FIG. 7(a), inlet-side inclined surface 23 is a convex shape. Therefore, a rising portion on fluid inlet side 11 of agitating element 20 becomes steeper, which renders a part of the fluid impinging on the surface 23 to a powerful flow (arrows H and J) heading for the tube axis, achieving a suitable agitation in the radial direction of the tube. As shown in FIG. 6(b), inlet-side inclined surface 23 is a concave shape. Therefore, an angle in the vicinity of top portion 21 of agitating element 20 becomes steeper, which accelerates a flow of the fluid impinging on agitating element 20 and heading for the downstream to provide a powerful flow (arrows E and K) from the middle, thus improving the agitation effect.

When outlet-side inclined surface 24 is a concave shape, as shown in FIG. 6(a), agitating element 20 becomes a steep profile immediately after top portion 21. It powerfully accelerates the fluid flow (arrow H') toward the inner surface of the tube. The accelerated fluid impinges on the tube's inner surface, thus breaking the stagnation of gas that occurs in the vicinity of the inner surface of the tube and improving the heat transfer efficiency. A part of the fluid becomes a swirl flow (arrow H") along the concave profile. On the other hand, when outlet-side inclined surface 24 is a convex shape, as shown in FIG. 6(b) and FIG. 7(a), the fluid can move smoothly along agitating element 20 immediately past top portion 21. Because the agitating element becomes steep toward the inner surface of the tube at a trailing portion, the fluid then accelerates to impinge on the tube's inner surface, as shown by arrows I' and J', thus breaking the stagnation of gas that occurs in the vicinity of the inner surface of the tube and improving the heat transfer efficiency.

Inlet-side inclined surface 23 and/or outlet-side inclined surface 24 having a convex or concave profile may be formed with at least one projected part 25 or recess part 26, thereby creating a turbulent flow in the fluid to enhance the agitation effect further.

As described above, agitating element 20 having top portion 21 formed in the inside of the tube and deviating to the fluid outlet side 11 improves the agitation effect of the fluid while minimizing an increase in the pressure loss of the fluid flowing through the tube, thereby improving heat transfer efficiency to achieve an increase in the yield of the target product. The agitating element is configured to prevent excessive heating and stagnation of the fluid gas by suitably agitating the fluid, thereby decreasing an occurrence of coking by excessive pyrolysis of the fluid, decreasing decoking works and increasing operating hours, and increasing the yield of the objective product.

The above description of the embodiments explains the present invention and should not interpret to limit the inventions recited in the claims or restrict the scope thereof. According to the present invention, each of the configurations is not limited to one embodiment described above and can make various modifications to them within the technical scope recited in the claims.

EXAMPLES

Example 1

An agitating element was formed on an inner surface of a tube as a build-up bead using TIG welding.

Figure 8:
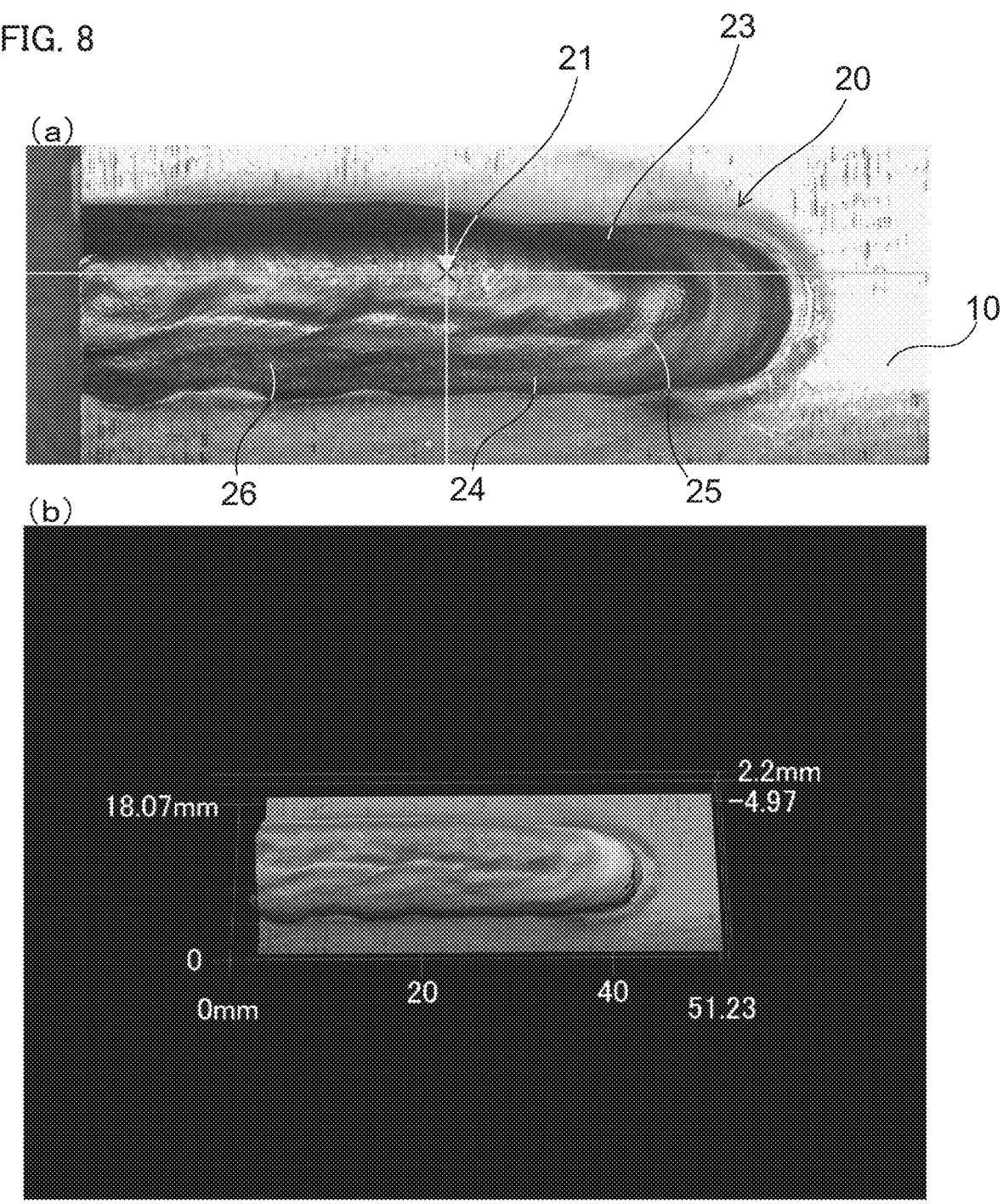
FIG. 8(a) is a texture of the agitating element formed in Example 1.
FIG. 8(b) illustrates a 3D photograph.
Figure 9:
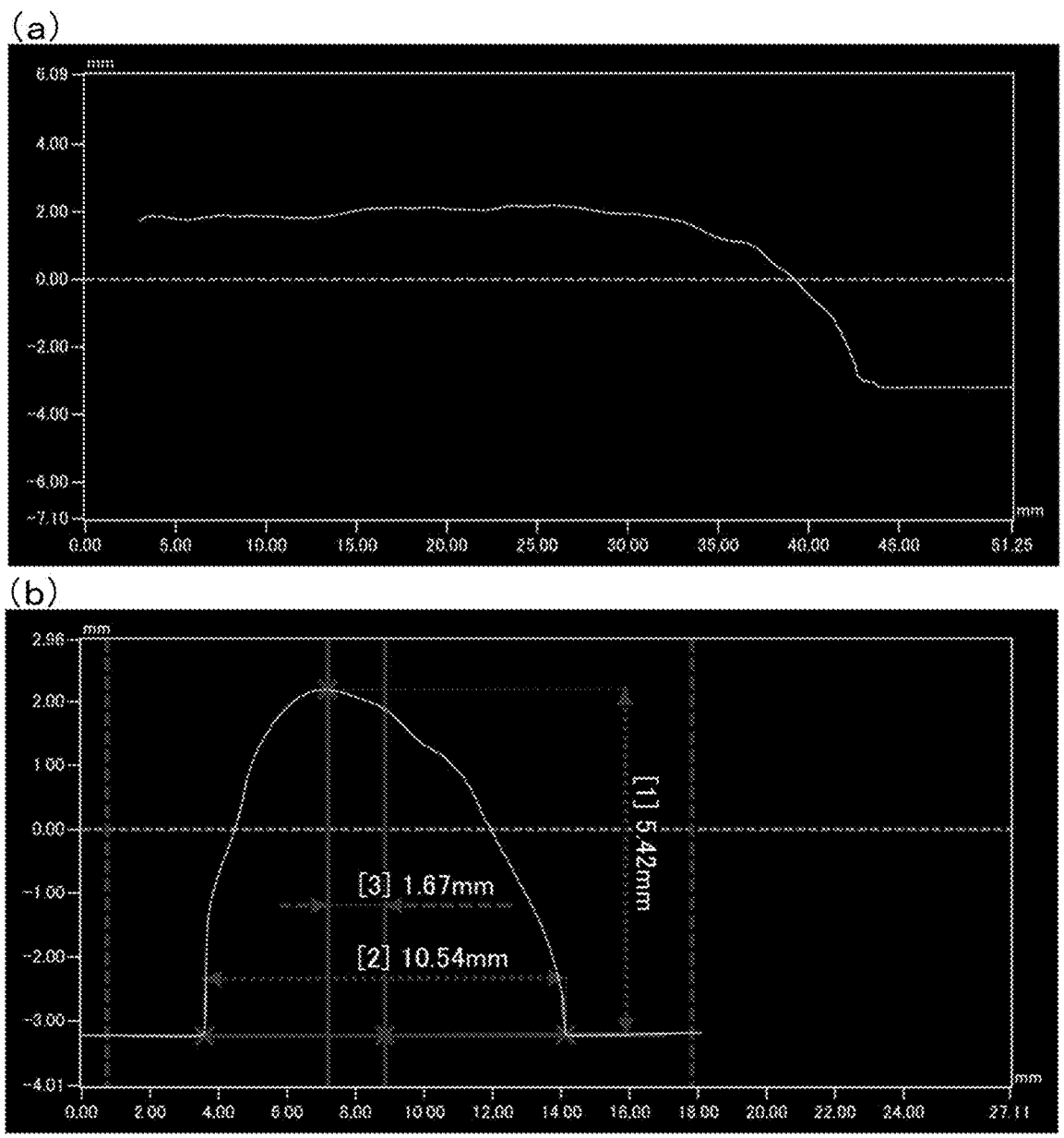
FIG. 9(a) is a profile graph in a longitudinal direction of the agitating element along a horizontal line in FIG. 8(a)
FIG. 9(b) is a profile graph in a width direction of the agitating element along a vertical line in FIG. 8(a).

FIG. 8(a) is a texture of the formed agitating element, and FIG. 8(b) is a 3D photograph. FIG. 9(a) is a profile graph in the longitudinal direction of the agitating element along the horizontal line of FIG. 8(a), and FIG. 9(b) is a profile graph in the width direction of the agitating element along the vertical line in FIG. 8(a). As illustrated, the agitating element has an off-center shape toward the fluid inlet side 11 of the cracking tube (upper side in FIG. 8).

Example 2

Figure 10:
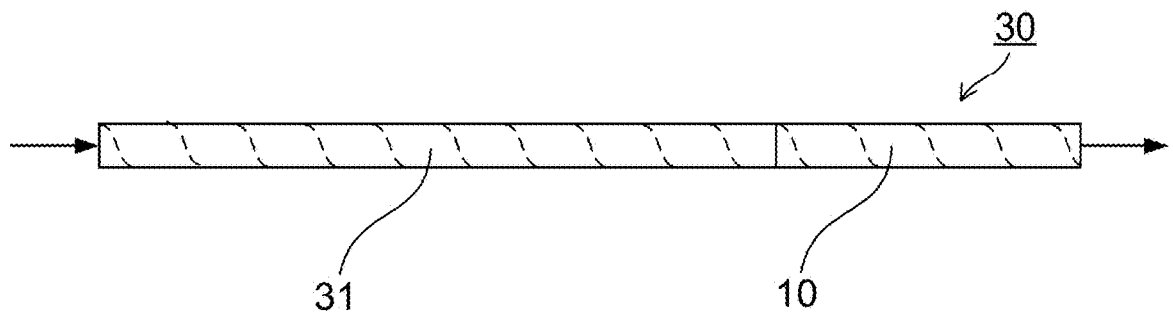
FIG. 10 illustrates a schematic configuration of a test tube of Example 2.

FIG. 10 shows a test tube 30 comprising preliminary section tube 31 on the upstream side and a thermal cracking tube 10 on the downstream side, wherein the tubes 31 and 10 are connected. The Inventive Examples 1-10 shown in FIG. 3 to FIG. 7 and the Comparative Examples 21-24 are used as thermal cracking tube 10 of the test tube 30. The test was conducted by passing the fluid through test tube 30 and measuring an outlet temperature (° C.) and an amount of heat exchange (kW).

The cracking tube 10 of Inventive Example 1 is shown in FIG. 3(a). Agitating element 20 of the cracking tube 10 comprises top portion 21 deviating to fluid inlet side 11, and inlet-side inclined tube 23 and outlet-side inclined surface 24, both with flat surfaces without convex and concave shapes. A width (2W) of the agitating element is 8.7 mm, a height (H1) of top portion 21 is 2.1 mm, and an off-center degree toward fluid outlet side 12 is 11%. Inlet-side inclined surface 23 of Inventive Example 1 has a gradual inclination. In contrast, outlet-side inclined surface 24 has a steep inclination, compared to inlet-side inclined surface 23.

The cracking tube 10 of Inventive Example 2 is shown in FIG. 3(b). Agitating element 20 of the cracking tube 10 comprises top portion 21 deviating to fluid inlet side 11 and flat surface 22. A width (2W) of agitating element 20 is 8.7 mm, a height (H1) of top portion 21 is 2.1 mm, a width of the flat surface 22 is 1.8 mm, and an off-center degree toward fluid inlet side 11 is 11%. Inlet-side inclined surface 23 and outlet-side inclined surface 24, both have flat surfaces without convex and concave shapes. Inlet-side inclined surface 23 of Inventive Example 2 has a steep inclination, compared to outlet-side inclined surface 24. In contrast, outlet-side inclined surface 24 has a gradual inclination, as compared to inlet-side inclined surface 23.

The cracking tube 10 of Inventive Example 3 is shown in FIG. 4(a). Agitating element 20 of the cracking tube 10 comprises top portion 21 deviating to fluid inlet side 11, inlet-side inclined surface 23 with a convex shape, and outlet-side inclined surface 24 with a concave shape. A width (2W) of the agitating element is 9.1 mm, a height (H1) of top portion 21 is 2.1 mm, and an off-center degree toward the fluid inlet side 11 is 13%. Inlet-side inclined surface 23 of Inventive Example 1 has a steep inclination, and outlet-side inclined surface 24 has a gradual inclination.

The cracking tube 10 of Inventive Example 4 is shown in FIG. 4(b). Agitating element 20 of the cracking tube 10 comprises top portion 21 deviating to fluid inlet side 11, inlet-side inclined tube 23 with a concave shape, and outlet-side inclined surface 24 with a convex shape. A width (2W) of the agitating element is 9.1 mm, a height (H1) of top portion 21 is 2.1 mm, and an off-center degree toward fluid inlet side 11 is 13%. Inlet-side inclined surface 23 of Inventive Example 4 has a steep inclination, and outlet-side inclined surface 24 has a gradual inclination.

The cracking tube 10 of Inventive Example 5 is shown in FIG. 5(a). Agitating element 20 of the cracking tube 10 comprises top portion 21 deviating to fluid inlet side 11, and inlet-side inclined tube 23 and outlet-side inclined surface 24, both with flat surfaces without convex and concave shapes. A width (2W) of the agitating element is 8.7 mm, a height (H1) of top portion 21 is 2.1 mm, and an off-center degree toward fluid outlet side 12 is 13%. Inlet-side inclined surface 23 of Inventive Example 4 has a gradual inclination, and outlet-side inclined surface 24 has a steep inclination.

The cracking tube 10 of Inventive Example 6 is shown in FIG. 5(b). Agitating element 20 of the cracking tube 10 comprises top portion 21 deviating to fluid outlet side 12, and flat surface 22. A width (2W) of the agitating element is 8.7 mm, a height (H1) of top portion 21 is 2.1 mm, a width of flat surface 22 is 1.8 mm, and an off-center degree toward fluid outlet side 12 is 11%. Inlet-side inclined tube 23 and outlet-side inclined surface 24, both have flat surfaces without convex and concave shapes. Inlet-side inclined surface 23 of Inventive Example 6 has a gradual inclination and outlet-side inclined surface 24 has a steep inclination.

The cracking tube 10 of Inventive Example 7 is shown in FIG. 6(a). Agitating element 20 of the cracking tube 10 comprises top portion 21 deviating to fluid outlet side 12, inlet-side inclined tube 23 with a convex shape, and outlet-side inclined surface 24 with a concave shape. A width (2W) of the agitating element is 8.8 mm, a height (H1) of top portion 21 is 2.1 mm, and an off-center degree toward fluid outlet side 12 is 7%. Inlet-side inclined surface 23 of Inventive Example 7 has a gradual inclination, and outlet-side inclined surface 24 has a steep inclination.

The cracking tube 10 of Inventive Example 8 is shown in FIG. 6(b). Agitating element 20 of the cracking tube 10 comprises top portion 21 deviating to fluid outlet side 12, inlet-side inclined tube 23 with a concave shape and outlet-side inclined surface 24 with a convex shape. A width (2W) of the agitating element is 8.8 mm, a height (H1) of top portion 21 is 2.1 mm, and an off-center degree toward fluid outlet side 12 is 7%. Inlet-side inclined surface 23 of Inventive Example 8 has a gradual inclination, and outlet-side inclined surface 24 has a steep inclination.

The cracking tube 10 of Inventive Example 9 is shown in FIG. 7(a). Agitating element 20 of the cracking tube 10 comprises top portion 21 deviating to fluid outlet side 12, and inlet-side inclined tube 23 and outlet-side inclined surface 24, both with convex shapes. A width (2W) of the agitating element is 8.9 mm, a height (H1) of top portion 21 is 2.1 mm, and an off-center degree toward fluid outlet side 12 is 12%. Inlet-side inclined surface 23 of Inventive Example 9 has a gradual inclination, and outlet-side inclined surface 24 has a steep inclination.

The cracking tube 10 of Inventive Example 10 is shown in FIG. 7(b). Agitating element 20 of the cracking tube 10 comprises top portion 21 deviating to fluid inlet side 11, and inlet-side inclined tube 23 and outlet-side inclined surface 24, both with concave shapes. A width (2W) of the agitating element is 8.9 mm, a height (H1) of top portion 21 is 2.1 mm, and an off-center degree toward fluid inlet side 11 is 9%. Inlet-side inclined surface 23 of Inventive Example 10 has a steep inclination, and outlet-side inclined surface 24 has a gradual inclination.

Figure 12:
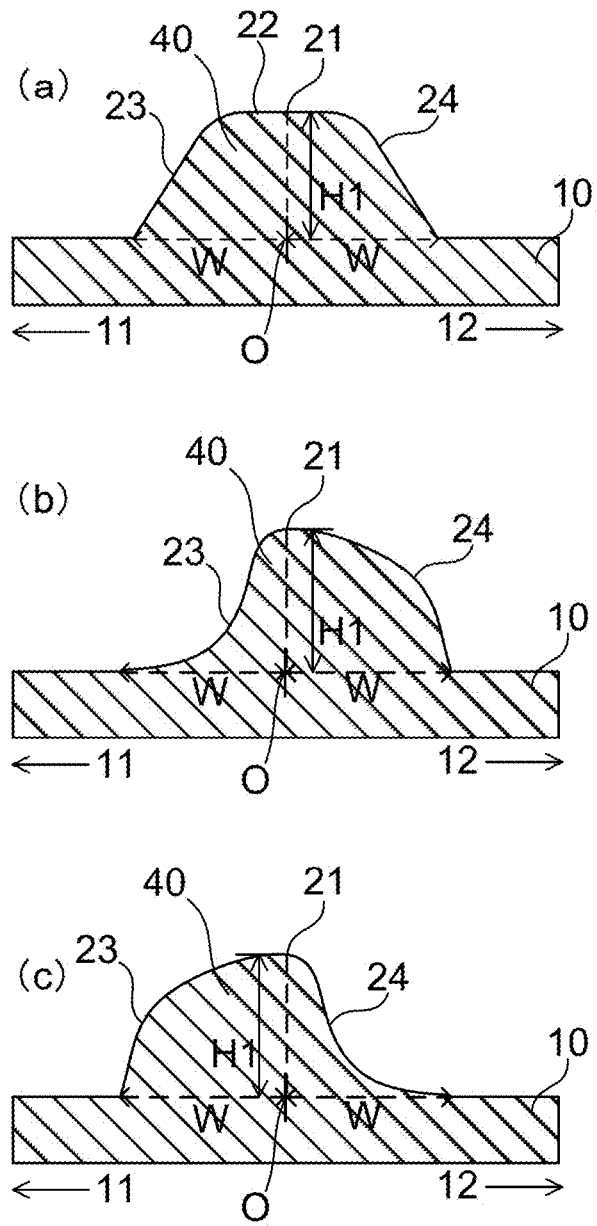
FIGS. 12(a), (b), and (c) are cross-sectional views of the agitating elements, wherein (a) shows Comparative Examples 21 and 22, (b) shows Comparative Example 23, and (c) shows Comparative Example 24.

The cracking tube 10 of Comparative Examples 21 and 22 comprises agitating element 40 having a top portion formed in a center in the width direction without any deviation, as shown in FIG. 12(a). Inlet-side inclined tube 23 and outlet-side inclined surface 24 of the Comparative Examples 21 and 22 are convex shapes. For Comparative Example 21, the width of the agitating element 40 is 8.7 mm, the height (H1) of top portion 21 is 2.1 mm, and the width of flat surface 22 is 2.8 mm. For Comparative Example 22, the width of the agitating element 40 is 6.6 mm, the height (H1) of top portion 21 is 1.5 mm, and the width of flat surface 22 is 2.0 mm.

The cracking tube 10 of Comparative Examples 23 and 24 also comprises agitating element 40 with a top portion formed in the center of the width direction of the agitating element without any deviation. Inlet-side inclined tube 23 and outlet-side inclined surface 24 of Comparative Examples 23 and 24 have no flat surface 22. For Comparative Example 23, inlet-side inclined tube 23 is a concave shape, and outlet-side inclined surface 24 is a convex shape. For Comparative Example 24, inlet-side inclined tube 23 is a convex shape, and outlet-side inclined surface 24 is a concave shape. For both Comparative Examples 23 and 24, the width of the agitating element 40 is 8.7 mm, and the height (H1) of top portion 21 is 2.1 mm.

The agitating element formed on the cracking tube 10 is, as shown in FIG. 1, a single line of a helically shaped projection having an angle θ (=30° relative to the tube axis.

The preliminary section tube 31 disposed on the upstream of test tube 30 is 1.6 m in length and has a wall surface insulated from heat. In all the Inventive Examples and Comparative Examples, preliminary section tube 31 is provided with the agitating element having the same helical shape as the cracking tube 10. The cracking tube 10 is 0.6 m in length and was heated such that the wall surface was kept at 1000° C.

A feedstock fluid consisting of 70 weight % of ethane and 30 weight % of water vapor was supplied to test tube 30 having the above-described structure such that the temperature was elevated to 700° C. in an entering mass flow rate of 0.2104 kg/s. A pressure loss (kPa) and a heat transfer coefficient (h) (W/m2*K) were measured at five points inside the cracking tube 10 to obtain an average of measurement. The test results are shown in FIG. 11.

Figure 11:
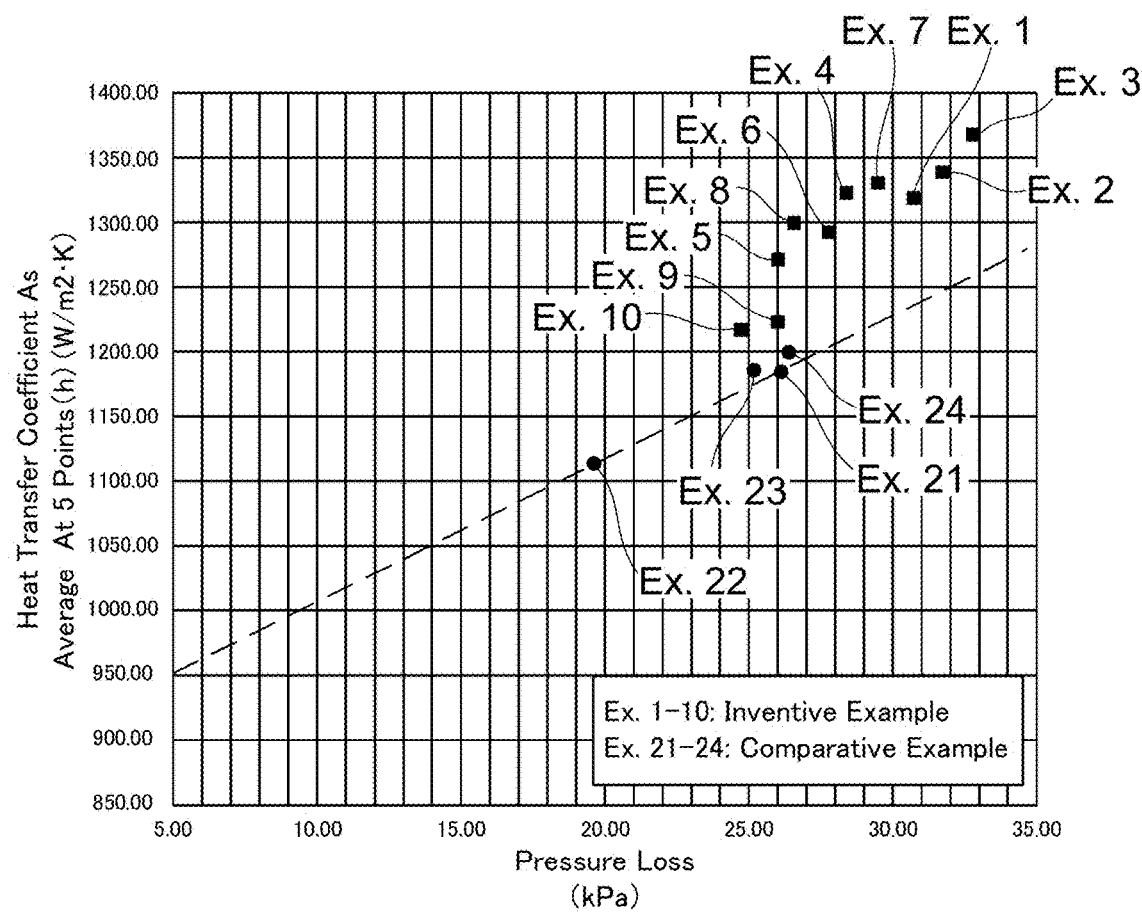
FIG. 11 is a graph illustrating a pressure loss and a heat transfer coefficient of Example 2.

With reference to FIG. 11, Inventive Examples 1-10 demonstrate that the heat transfer coefficient was more than about 10% higher than Comparative Examples 21-24, though the pressure loss slightly increased. The reason why the pressure loss of Inventive Examples is larger than Comparative Examples is in that top portion 21 of agitating element 20 deviates to the fluid inlet side 11 or the fluid outlet side 12, with the result that the agitation of the fluid was facilitated to increase the agitation energy, compared to Comparative Example having no off-center of the top portion.

On the other hand, the heat transfer efficiency of Inventive Examples is higher than Comparative Examples. This is because top portion 21 of agitating element 20 deviates to the fluid inlet side 11 or the fluid outlet side 12, the fluid was stirred sufficiently to lead to a decreased temperature difference in the radial direction of the cracking tube 10, thereby achieving a uniform temperature rise. It is noted that a flow of the fluid passing over agitating element 20 prevented an occurrence of gas stagnation in the vicinity of the inside of the tube and also destroyed the stagnation of gas that occurs on the inner surface of the cracking tube. This also contributed to an improvement in heat transfer efficiency.

In comparison between the Inventive Examples, the steeper the slope of the inlet-side inclined surface 23, the greater the pressure loss and the higher the heat transfer coefficient. Since top portion 21 of agitating element 20 deviates to the fluid inlet side 11, the inlet-side inclined surface 23 becomes steeper. Therefore, when the fluid hits against the inlet-side inclined surface 23, the flow heading for the tube axis, such as a flow of arrow A (Inventive Examples 1 and 2) in FIGS. 3(a) and (b), a flow of arrow D (Inventive Example 3) in FIG. 4(a), a flow of arrow E (Inventive Example 4) in FIG. 4(b), and a flow of arrow K (Inventive Example 10) in FIG. 7(b), becomes powerful, with the result that the fluid was stirred sufficiently in the radial direction of the cracking tube 10 to lead to a decreased temperature difference in the radial direction of the cracking tube 10, thereby achieving a uniform temperature rise. Despite the gradual slope on the inlet-side inclined surface 23, an improvement of the heat transfer efficiency can be achieved by forming the inlet-side inclined surface 23 into a convex shape or a concave shape.

DESCRIPTION OF REFERENCE SIGNS

10 a thermal cracking tube
20 an agitating element
21 a top portion

The invention claimed is:

1. A thermal cracking tube with an agitating element to be heated from outside, the thermal cracking tube comprising,
   a tube having a tube axis with one end and another end, wherein a fluid inlet is on the one end and a fluid outlet is on the another end, the tube having an inner surface with a diameter of at least about 30 mm and being configured to thermally crack a hydrocarbons-containing feedstock fluid material over a reaction temperature range, and
   at least one agitating element for agitating the feedstock fluid material, wherein the agitating element is provided on the inner surface of the tube and extends inwardly from the inner surface of the tube and has an inwardly facing top portion,
   wherein
   the agitating element is helically inclined to or is orthogonal to a longitudinal direction of the tube axis, and has oppositely inclined surfaces across the top portion thereof,
   the oppositely inclined surfaces comprise an inlet-side inclined surface on the fluid inlet side and an outlet-side inclined surface on the fluid outlet side,
   when the agitating element is viewed in a sectional plane including the tube axis, the top portion of the agitating element is located on the fluid inlet side or the fluid outlet side, relative to a center of a width of the agitating element, wherein
   (1) the inlet-side inclined surface has a concave shape and the outlet-side inclined surface has a convex shape, or
   (2) the inlet-side inclined surface has a convex shape and the outlet-side inclined surface has a concave shape.

2. The thermal cracking tube with an agitating element according to claim 1, wherein the top portion of the agitating element is located on the fluid inlet side by at least 10% or to the fluid outlet side by at least 5%, relative to the distance from a peak of the top portion to the center of the width of the agitating element.

3. The thermal cracking tube with an agitating element according to claim 1, wherein the top portion of the agitating element is located on the fluid inlet side by up to 90% or to the fluid outlet side by up to 85%, relative to the distance from a peak of the top portion to the center of the width of the agitating element.

4. The thermal cracking tube with an agitating element according to claim 1, wherein the inlet-side inclined surface and the outlet-side inclined surface are different in their inclined angles.

5. The thermal cracking tube with an agitating element according to claim 2, wherein the inlet-side inclined surface and the outlet-side inclined surface are different in their inclined angles.

6. The thermal cracking tube with an agitating element according to claim 3, wherein the inlet-side inclined surface and the outlet-side inclined surface are different in their inclined angles.

7. The thermal cracking tube with an agitating element according to claim 1, wherein the inclined surface of the convex shape or the concave shape further includes at least one projected part or recessed part.

8. The thermal cracking tube with an agitating element according to claim 1, wherein the agitating element has a length longer in the longitudinal direction than the width direction.

9. The thermal cracking tube with an agitating element according to claim 2, wherein the agitating element has a length longer in the longitudinal direction than the width direction.

10. The thermal cracking tube with an agitating element according to claim 3, wherein the agitating element has a length longer in the longitudinal direction than the width direction.

11. The thermal cracking tube with an agitating element according to claim 1, wherein the top portion has a flat surface wherein a center in the width direction of the flat surface deviates to the fluid inlet side or the fluid outlet side.

* * * * *